United States Patent [19]
Liang

[11] Patent Number: 5,928,341
[45] Date of Patent: Jul. 27, 1999

[54] DYNAMIC PRINTER-PORT SWITCHER FOR SELECTIVELY CONNECTING AT LEAST TWO PERIPHERAL DEVICES TO A PC HAVING A PRINTER PORT

[76] Inventor: Hang-Shang Liang, No. 12, Lane 171, Sec. 2, Pei-Hsin Rd., Hsin-Tien, Taiwan

[21] Appl. No.: 08/923,327

[22] Filed: Sep. 4, 1997

[30] Foreign Application Priority Data

Jun. 17, 1997 [TW] Taiwan .................................. 86209899

[51] Int. Cl.⁶ ........................................................ G06F 13/14
[52] U.S. Cl. .................................. 710/72; 710/9; 710/16; 710/101
[58] Field of Search .................................... 395/892, 821, 395/114; 710/1, 72, 9, 16, 101

[56] References Cited

U.S. PATENT DOCUMENTS

| | | | |
|---|---|---|---|
| 5,457,784 | 10/1995 | Well et al. ........................ | 395/829 |
| 5,513,302 | 4/1996 | Tsai ............................... | 395/114 |
| 5,555,436 | 9/1996 | Gavish ............................ | 395/821 |
| 5,717,957 | 2/1998 | Lin ................................ | 395/892 |
| 5,732,199 | 3/1998 | Kau et al. ........................ | 395/114 |

*Primary Examiner*—Thomas C. Lee
*Assistant Examiner*—Abdelmoniem I Elamin
*Attorney, Agent, or Firm*—Rabin & Champagne, P.C.

[57] ABSTRACT

A dynamic printer-port switcher (DPS) is provided for use on a computer system such as a personal computer (PC) for selectively connecting the PC to a number of peripheral devices, such as printers, PC cameras, scanners, external CD-ROM drives, and external hard disk drives, through software control. Broadly, the DPS includes a printer-port connector for connecting the DPS to a printer port on the PC, at least two peripheral de connectors for connecting the DPS to two peripheral devices such as a printer and a PC camera. Further, the DPS includes a first and second switching circuits which are under control by a control circuit to selectively connect the PC to one of the connected peripheral devices.

14 Claims, 9 Drawing Sheets

DYNAMIC PRINTER-PORT SWITCHER FOR SELECTIVELY CONNECTING AT LEAST TWO PERIPHERAL DEVICES TO A PC HAVING A PRINTER PORT

BACKGROUND OF THE INVENTION

1. Field of the Invention

This invention relates to input/output port switchers for personal computers (PC), and more particularly, to a dynamic printer-port switcher (DPS) which allows a PC to be selectively connected under software control to one of a plurality of peripheral devices, such as printers, PC cameras, and other various peripheral devices.

2. Description of Related Art

A PC is customarily provided with a printer port (i.e., the parallel port) that allows the PC to be connected to a printer. In addition, the printer port allows the PC to be connected to various other peripheral devices, such as a PC camera, a scanner, an external CD-ROM drive, an external hard disk drive, and so on. However, since one PC is typically provided with only one printer port, the PC can be connected to these peripheral devices only one at a time. When the user wishes to connect the PC to another peripheral device, he/she should first disconnect the current peripheral device from the printer port and then connect the desired one to the printer port. This work is quite inconvenient and laborious for the user to do. It also causes wear to the connectors of these peripheral devices.

One solution to the foregoing problem is to provide each of the peripheral devices with a dedicated connecting port on the PC. However, since the dedicated connecting ports are provided on additional expansion cards, they will occupy more expansion slots in the PC. Therefore, although this solution may be suitable for desktop computers which are spacious enough to provide enough expansion slots, it is not suitable for notebook computers. Moreover, the provision of these additional expansion cards is quite costly to realize.

A cheap solution is to connect all of the peripheral devices via a switcher to the printer port, which allows the user to selectively switch the connection between the PC and one of the peripheral devices.

Figure 1:
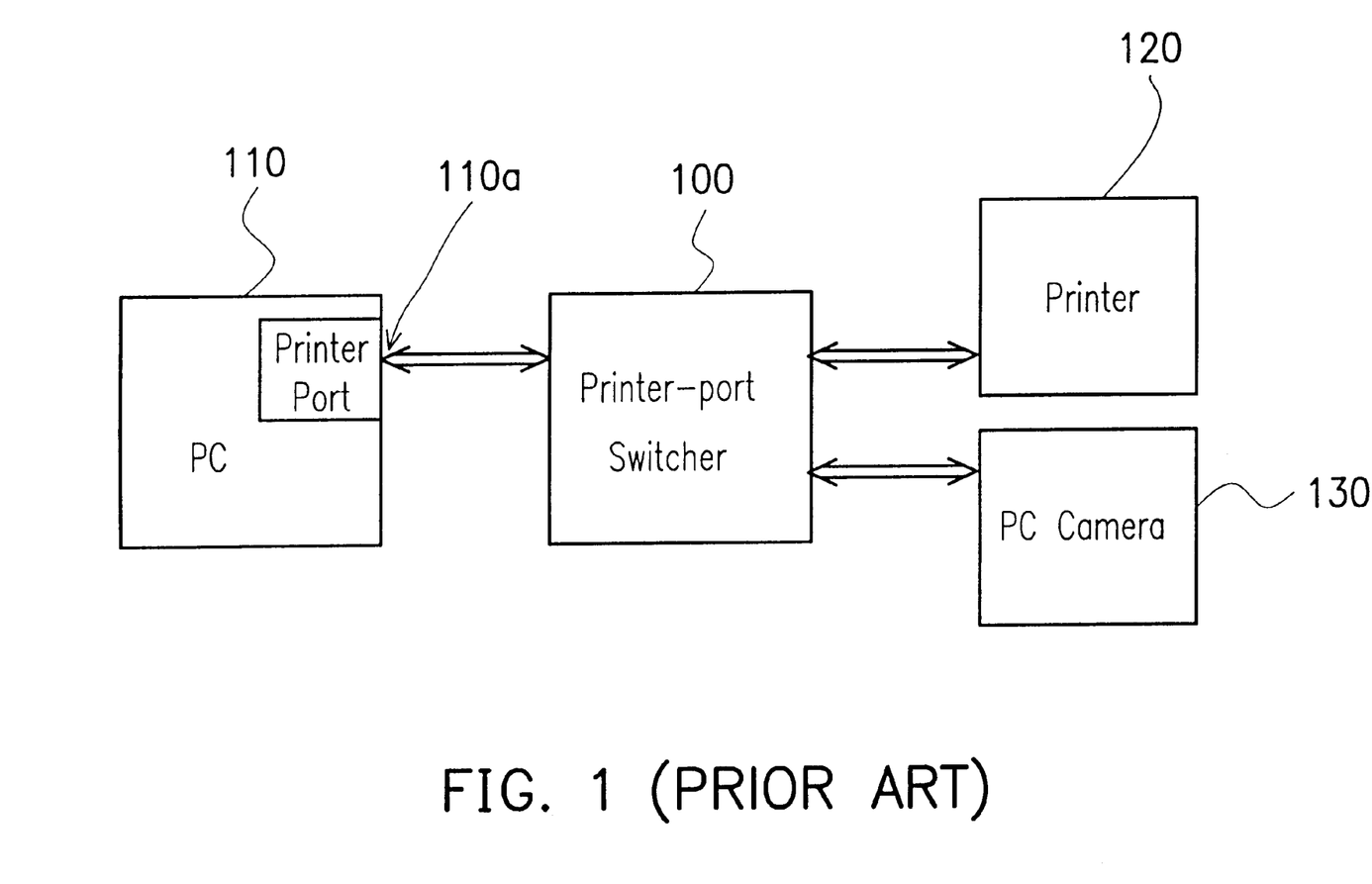
FIG. 1 is a schematic block diagram used to depict the use of a conventional printer-port switcher to selectively connect a PC to two peripheral devices.

FIG. 1 is a schematic block diagram used to depict the application of a conventional printer-port switcher 100 for selectively connecting a PC 110 to either one of two peripheral devices, such as a printer 120 and a PC camera 130. The printer-port switcher 100 has one port connected to the printer port 110a on the PC 110 and the other two ports connected respectively to the printer 120 and the PC camera 130. Only one of the printer 120 and the PC camera 130 can be connected via the printer-port switcher 100 to the printer port 110a at a time. The user can do this simply by manually flipping a switch (not shown) on the printer-port switcher 100. However, the manual operation is quite inconvenient and laborious to do.

There is a conventional electronic type of switcher which is specifically devised for a PC to be selectively connected to a number of printers. The destination printer is software-controllable by the user. This type of switcher, however, is only uni-directional, which means that the data can be transferred only from the PC to the selected one of the printers, and not in the reverse direction. Therefore, it can not be used to connect those types of peripheral devices that involve data input to the PC, such as PC cameras, scanners, external CD-ROM drives, and external hard disk drives. There exists, therefore, a need for a dynamic printer-port switcher that can transfer data between a PC and a plurality of peripheral devices in both directions.

SUMMARY OF THE INVENTION

It is therefore a primary objective of the present invention to provide a dynamic printer-port switcher which allows a PC to be selectively connected to a number of peripheral devices such as printers, PC cameras, scanners, external CD-ROM drives, external hard disk drives, and so on.

It is another objective of the present invention to provide a dynamic printer-port switcher which allows the user to select the destination one of the connected peripheral devices by software means.

It is still another objective of the present invention to provide a dynamic printer-port switcher which allows the transfer of data between the PC and the peripheral devices to be carried out both in a bi-directional manner and in a unidirectional data manner.

In accordance with the foregoing and other objectives of the present invention, a new dynamic printer-port switcher (DPS) for PCs is provided.

Broadly speaking, the DPS of the invention is capable of selectively connecting under software control at least two peripheral devices including a first peripheral device, such as a printer, and a second peripheral device, such as a PC camera, to a PC having a printer port. The DPS includes the following constituent elements:

(a) a printer-port connector for connecting the dynamic printer-port switcher via the printer port to the PC, the printer-port connector having a plurality of signal pins;

(b) a first peripheral connector for connecting the dynamic printer-port switcher to the first peripheral device, the first peripheral connector having a plurality of signal pins;

(c) a second peripheral connector for connecting the dynamic printer-port switcher to the second peripheral device, the first peripheral connector having a plurality of signal pins;

(d) a first switching circuit connected between the printer-port connector and the first peripheral connector;

(e) a second switching circuit connected between the printer-port connector and the second peripheral connector; and (f) a control circuit, receiving software-issued control signals via the printer-port connector from the PC, for correspondingly generating a first control signal to command the first switching circuit to connect the signal pins on the first peripheral connector in a one-to-one manner to the signal pins on the printer-port connector and a second control signal to command the second switching circuit to connect the signal pins on the second peripheral connector in a one-to-one manner to the signal pins on the printer-port connector.

The above-mentioned control circuit includes the following constituent elements:

(a) a fast-charging/slow-discharging RC circuit having a small charging time constant and a large discharging time constant, the fast-charging/slow-discharging RC circuit having an input end connected to receive a request signal from the printer-port connector and an output end which outputs the voltage state of the request signal;

(b) a first D-type flip-flop having a clock input, a clear input, a D input, a normal output, and a complement output; wherein the clock input is connected to receive the request signal from the printer-port connector, the clear input is connected to receive the output of the fast-charging/slow-discharging RC circuit, and the D input is connected to receive the complement output of the first D-type flip-flop;

(c) a second D-type flip-flop having a clock input, a clear input, a D input, a normal output, and a complement output; wherein the clock input is connected to receive the complement output of the first D-type flip-flop, the clear input is connected to receive the output of the fast-charging/slow-discharging RC circuit, and the D input is connected to receive the complement output of the second D-type flip-flop;

(d) a first AND gate having a first input connected to receive the normal output of the second D-type flip-flop and a second input connected to receive the request signal from the printer-port connector;

(e) a second AND gate having a first input connected to receive the normal output of the first D-type flip-flop and a second input connected to receive the output of the first AND gate; and (f) a third AND gate having a first input connected to receive the output of the first AND gate and a second input connected to receive the complement output of the first D-type flip-flop.

The above-mentioned first switching circuit includes the following constituent elements:

(a) a switch of a bi-directional type, under control by the complement output of the second D-type flip-flop, for connecting a first group of signal pins on the print-port connector to a corresponding group of signal pins on the first peripheral connector; and (b) a buffer circuit of a uni-directional type, under control by the normal output of the second D-type flip-flop, for connecting a second group of signal pins on print-port connector to a corresponding group of signal pins on the first peripheral connector.

And the second switching circuit includes the following constituent elements:

(a) a first switch set of a bi-directional type, under control by the output of the second AND gate in the control circuit, for connecting a first group of signal pins on the print-port connector to a corresponding group of signal pins on the PC-camera connector;

(b) a second switch set of a bi-directional type, under control by the output of the third AND gate in the control circuit, for connecting a second group of signal pins on the print-port connector to a corresponding group of signal pins on the PC-camera connector; and (c) an AND gate, under control by the output of the first AND gate in the control circuit, for connecting one signal pin on the print-port connector to a corresponding pin on the PC-camera connector.

The foregoing DPS of the invention allows a PC to be selectively connected to a number of peripheral devices connected via the DPS to the PC by means of software control. These peripheral devices can be printers, PC cameras, scanners, external CD-ROM drives, and external hard disk drives. Moreover, these peripheral devices can be uni-directional or bi-directional data types. All the selections and controls are achieved by the software so that the user is free from manually operating any switches.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

In the following preferred embodiment, the dynamic printer-port switcher (DPS) of the invention is specifically devised to allow a PC to be selectively connected to one of two peripheral devices including a printer and a PC camera. However, it will be understood that the invention is not limited to such an application. Broadly speaking, the invention allows a PC to be selectively connected to one of a plurality of peripheral devices, such as printers, PC cameras, scanners, external CD-ROM drives, external hard disk drives, and various other peripheral devices.

Figure 2:
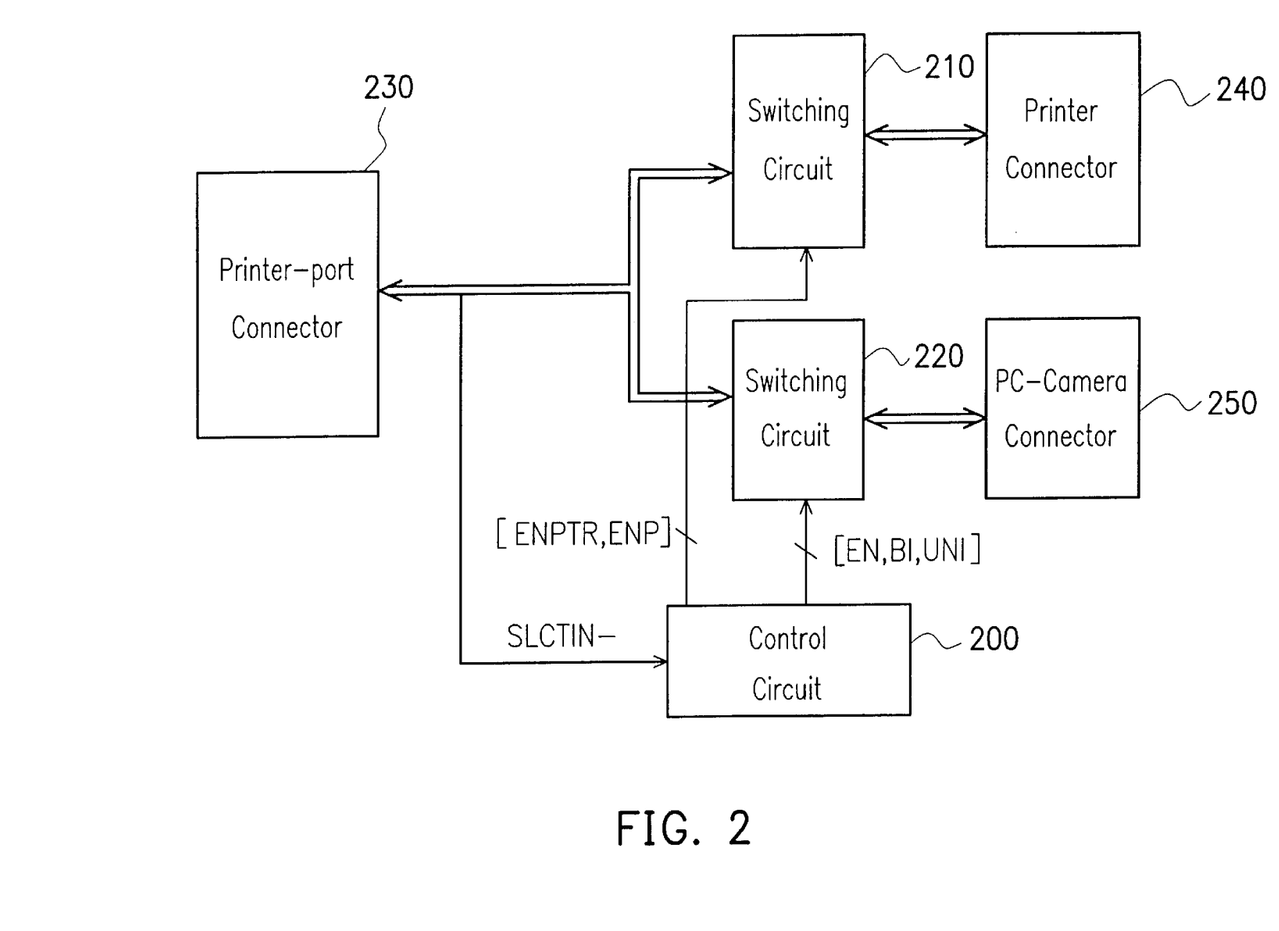
FIG. 2 is a schematic block diagram of the dynamic printer-port switcher (DPS) according to the invention.

FIG. 2 is a schematic block diagram of the DPS of the invention, which includes a printer-port connector 230 for connecting the DPS to a printer port (not shown) on the PC (not shown), a printer connector 240 for connecting the DPS to a printer (not shown), a PC camera connector 250 for connecting the DPS to a PC camera (not shown) and a first and second switching circuits 210, 220 which are under control by a control circuit 200 to selectively connect one of the printer connector 240 and the PC camera connector 250 to the printer connector 230. The control circuit 200 can receive instructions via the printer-port connector 230 from the PC to control the first and second switching circuits 210, 220.

Figure 3A:
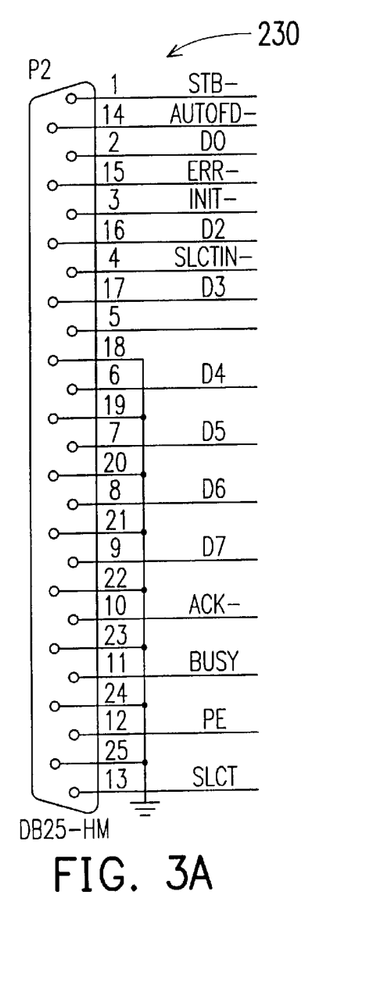
FIG. 3A is a schematic diagram showing the pin configuration of a printer-port connector used in the DPS of FIG. 2.
Figure 3B:
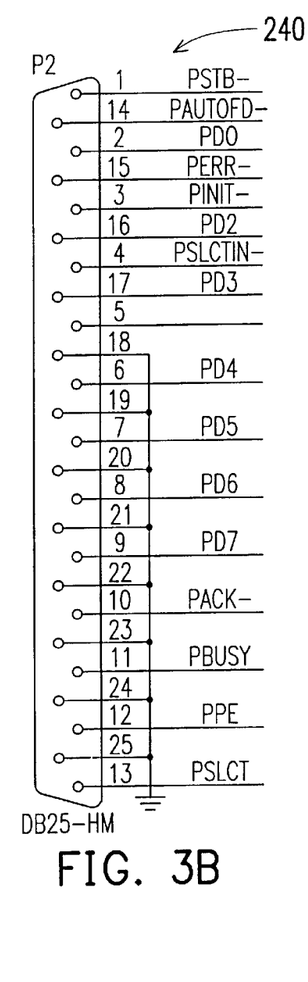
FIG. 3B is a schematic diagram showing the pin configuration of a printer connector used in the DPS of FIG. 2.
Figure 3C:
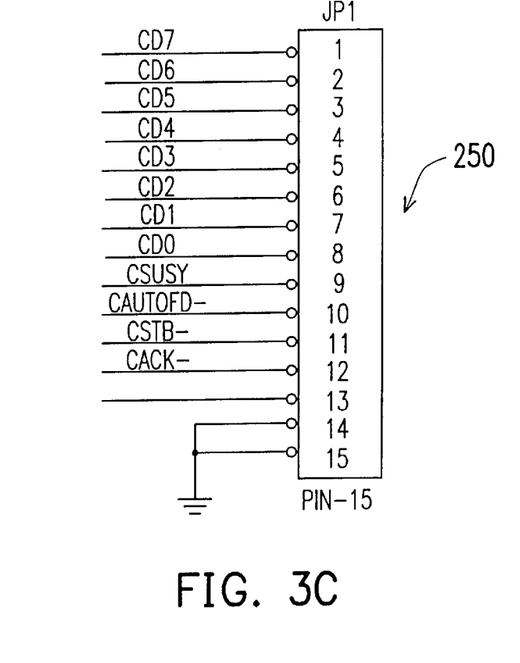
FIG. 3C is a schematic diagram showing the pin configuration of a PC-camera connector used in the DPS of FIG. 2.

FIGS. 3A, 3B, and 3C are schematic diagrams respectively showing the pin configurations of the printer-port connector 230, the printer connector 240, and the PC camera connector 250.

As shown in FIG. 3A, the printer-port connector 230 includes a set of pins used to transfer a set of data signals D0–D7 and a set of control signals STB-, AUTOFD-, ERR-, INIT-, SLCTIN-, ACK-, BUSY, PE, and SLCT.

As shown in FIG. 3B, the printer connector 240 includes a set of pins used to transfer a set of data signals PD0–PD7 and a set of control signal PSTB-, PAUTOFD-, PERR-, PINIT-, PSLCTIN-, PACK-, PBUSY, PPE, and PSLCT.

As shown in FIG. 3C, the PC camera connector 250 includes a set of pins used to transfer a set of data signals CD0–CD7 and a set of control signals CBUSY, CAUTOFD-, CSTB-, and CACK-.

More specifically, the DPS of the invention is used to connect the above-mentioned pins on the printer-port connector 230 selectively in a one-to-one manner to the pins on the printer connector 240 and the pins on the PC camera connector 250.

Figure 4A:
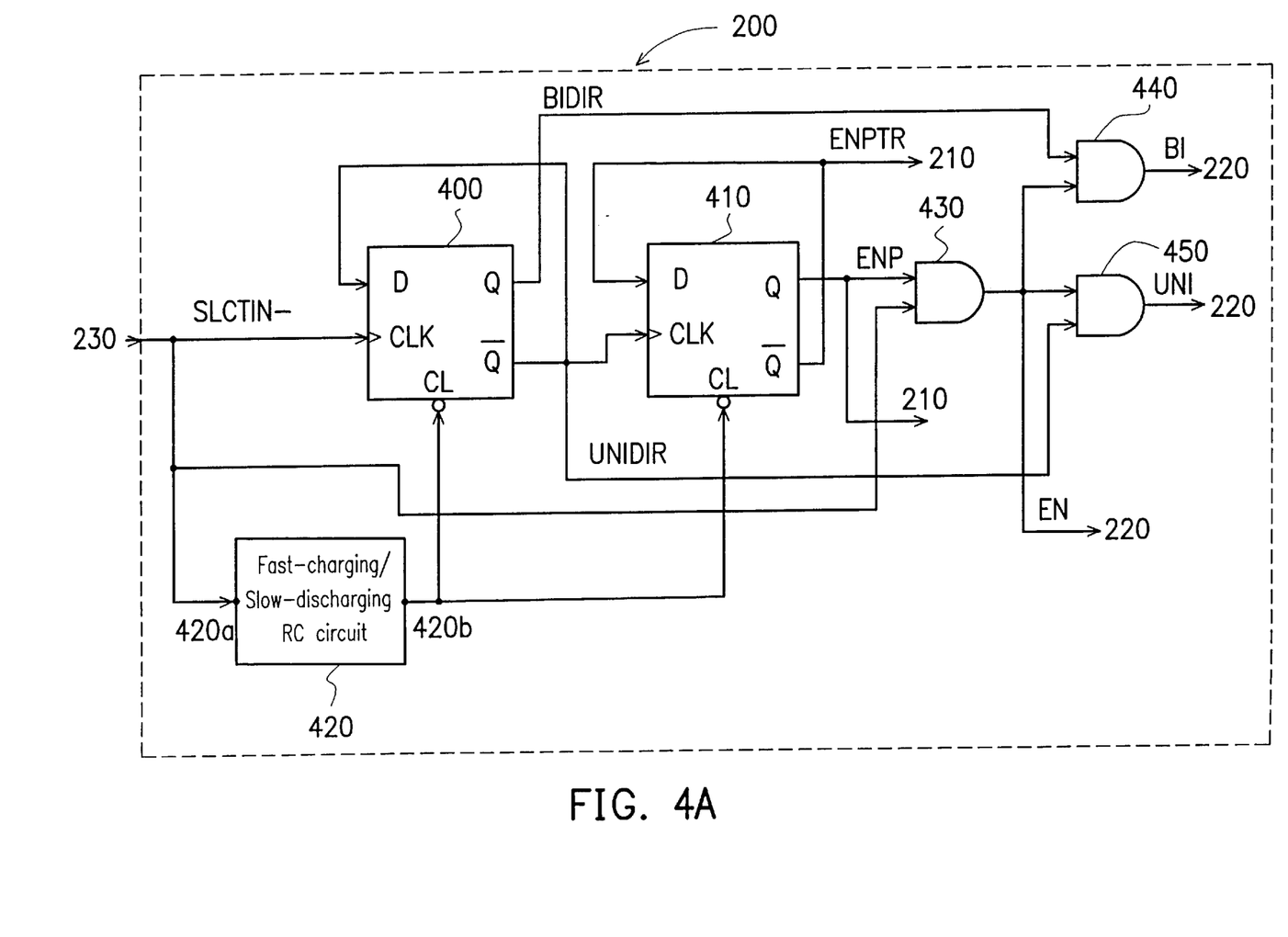
FIG. 4A is a schematic circuit diagram of a control unit used in the DPS of FIG. 2.

FIG. 4A shows a schematic circuit diagram of the control circuit 200, which includes a first D-type flip-flop 400, a second D-type flip-flop 410, a fast-charging/slow-discharging RC circuit 420 which has the characteristics of a small charging time constant and a large discharging time constant, a first AND gate 430, a second AND gate 440, and a third AND gate 450. Each of the first and second D-type flip-flops 400, 410 has an input D, a clock input CLK, a direct clear input CL, a normal output Q, and a complement output $\overline{Q}$.

The input end of the control circuit 200 is connected to receive the SLCTIN- signal from the printer-port connector 230. The received SLCTIN- signal is directed in three ways respectively to the clock input CLK of the first D-type flip-flop 400, the input end 420a of the fast-charging/slow-discharging RC circuit 420, and one input end of the first AND gate 430. The output end 420b of the fast-charging/slow-discharging RC circuit 420 is connected in two ways respectively to the direct clear input CL of the first D-type flip-flop 400 and the same of the second D-type flip-flop 410.

The complement output $\overline{Q}$ of the first D-type flip-flop 400 is denoted as UNIDIR and is connected in three ways respectively to its own input D as a feedback, to the clock input CLK of the second D-type flip-flop 410, and to one input of the third AND gate 450.

The complement output $\overline{Q}$ of the second D-type flip-flop 410 is denoted as ENPTR, which is fed back to its own D input and used as an input to the first switching circuit 210. The normal output Q is denoted as ENP and connected to one input of the first AND gate 430.

The first AND gate 430 has a first input end receiving the ENP signal (i.e., the normal output Q of the second D-type flip-flop 410) and a second input end receiving the SLCTIN- signal from the printer-port connector 230. The logic output of the first AND gate 430 is denoted as EN.

The second AND gate 440 has a first input end receiving the BIDIR signal (i.e., the normal output Q of the first D-type flip-flop 400) and a second input end receiving the EN signal (i.e., the output of the first AND gate 430. The logic output of the second AND gate 440 is denoted as BI and transferred to the second switching circuit 220.

The third AND gate 450 has a first input end receiving the EN signal from the first AND gate 430 and a second input end receiving the UNIDIR signal (i.e., the complement output $\overline{Q}$ of the first D-type flip-flop 400). The logic output of the third AND gate 450 is denoted as UNI and transferred to the second switching circuit 220.

Figure 4B:
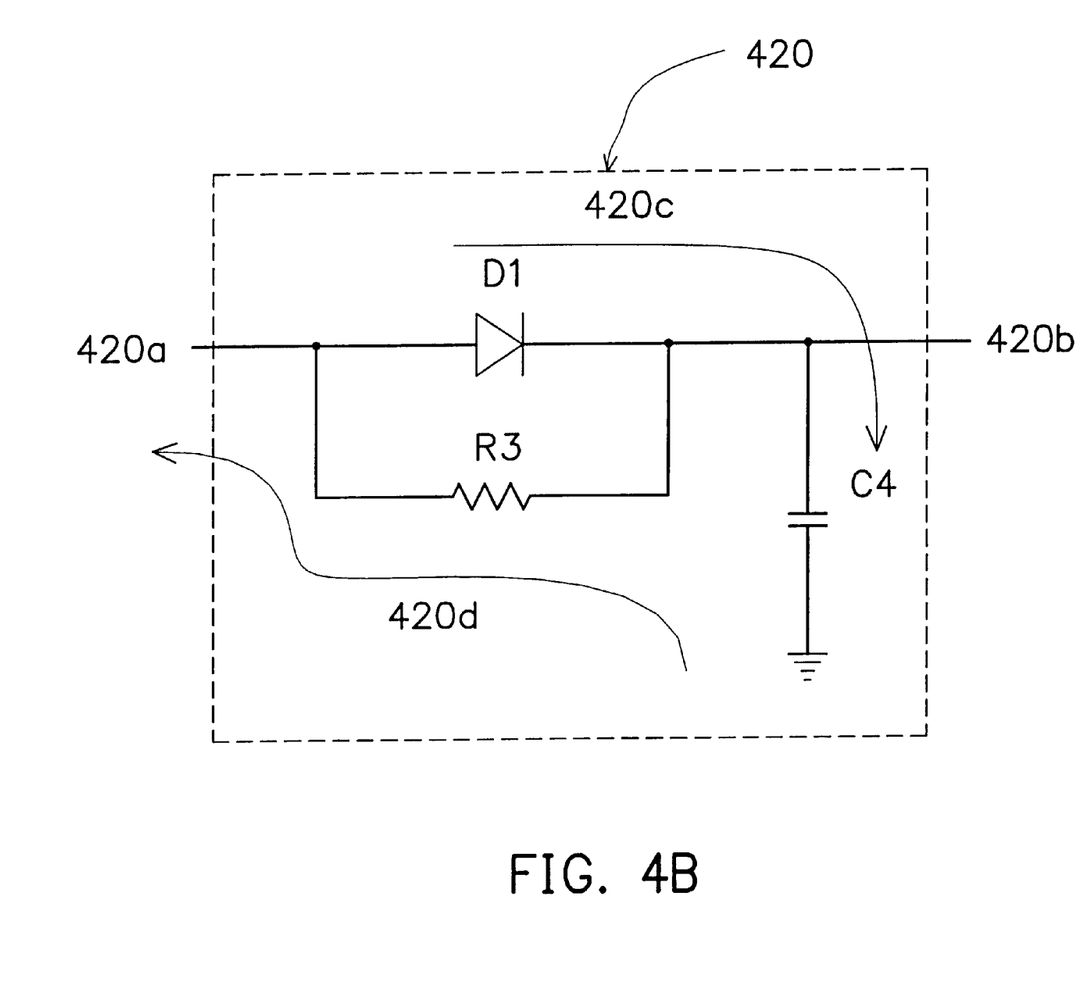
FIG. 4B is a circuit diagram of a fast-charging/slow-discharging RC circuit used in the control unit of FIG. 4A.

Referring to FIG. 4B, the fast-charging/slow-discharging RC circuit 420 includes a diode D1 having a positive end connected to the input end 420a and a negative end connected to the output end 420b, a resistor R3 connected across the diode D1, and a capacitor C4 having a first end connected to the negative end of the diode D1 and a second end connected to the ground. The voltage across the capacitor C4 is taken as the output of the fast-charging/slow-discharging RC circuit 420.

When a positive voltage is applied to the input end 420a, a charge current flowing in a direction as designated by the reference numeral 420c will pass through the diode D1 to charge the capacitor C4. Since in this case the diode D1 is forward-biased and thus is nearly zero in resistance, the equivalent time constant is small, resulting in a fast charging of the capacitor C4. Thereafter, when the voltage at the input end 420a is removed, the charge on the capacitor C4 will be discharged through the resistor R3. The time constant of the discharging therefore takes the resistance of R3 into account, resulting in a slow discharging of the capacitor C4.

Figure 7A:
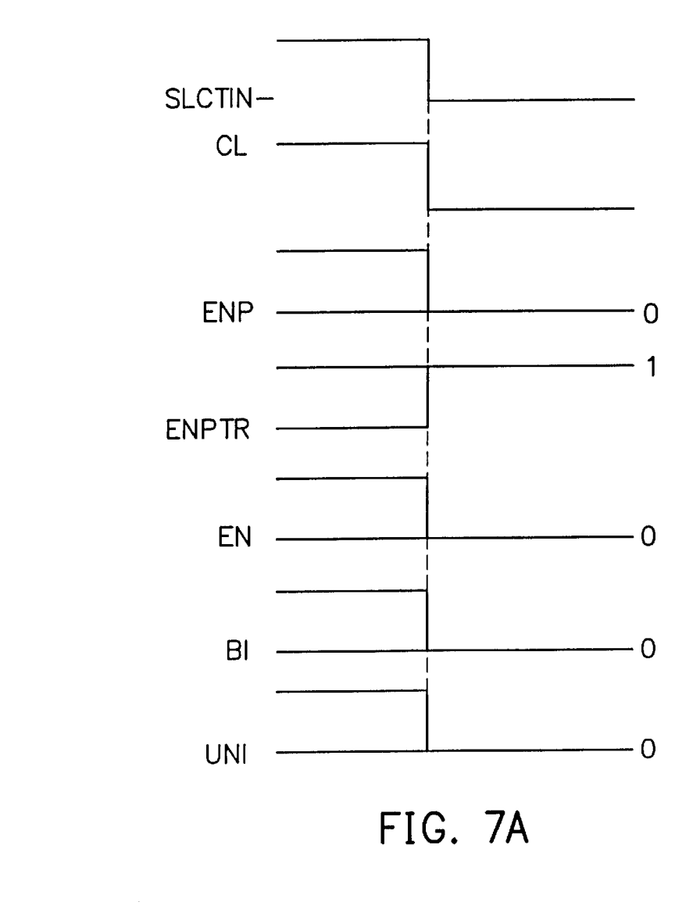
FIGS. 7A through 7C are signal diagrams used to depict the logic voltage states of various control signals used to control the operation of the DPS of the invention.
Figure 7B:
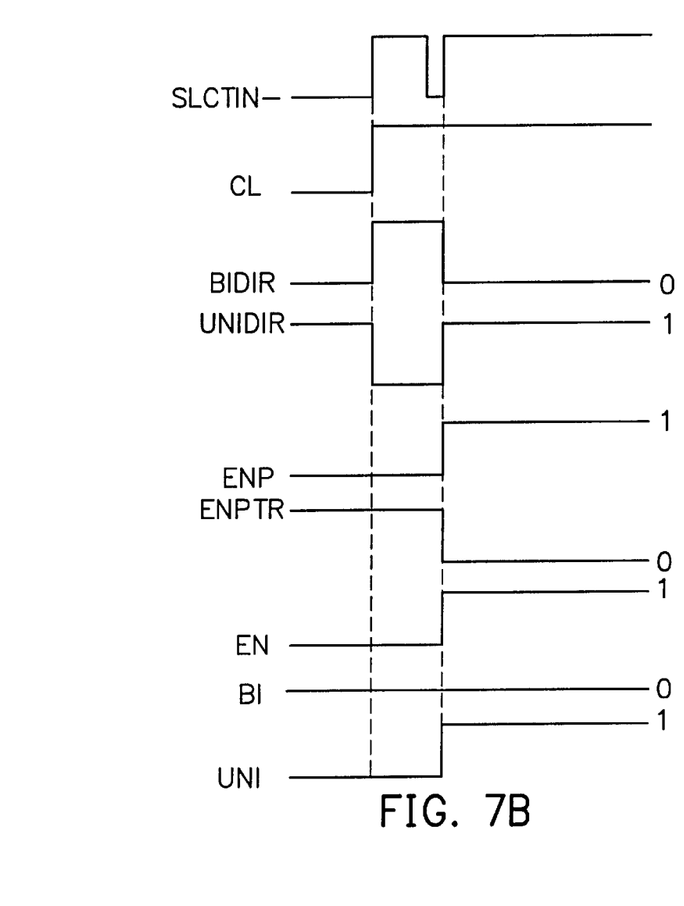
Figure 7C:
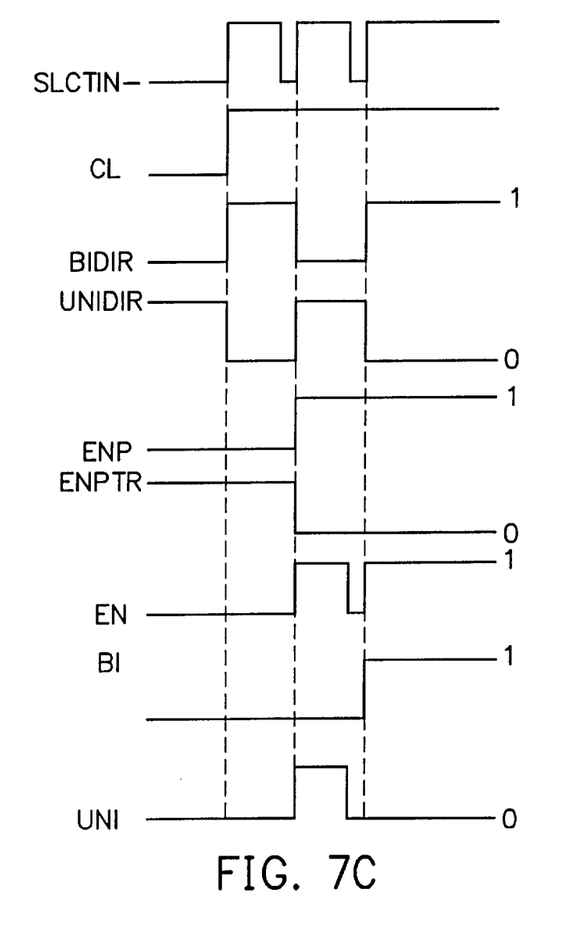

FIGS. 7A through 7C are signal diagrams used to depict the logic voltage states of various control signals used to control the operation of the DPS of the invention.

When the user of the PC wants to select one of the printer and the PC camera for use, the request signal is sent from the PC via the SLCTIN- pin on the printer-port connector 230 to the control circuit 200. In response to this request signal, the control circuit 200 issues a corresponding control signal to control the first and second switching circuits 210, 220 to selectively connect the desired one of the peripheral devices via the printer-port connector 230 to the PC. The reason of utilizing the SLCTIN- signal for the control of the DPS of the invention is to allow the invention to be in compliance with industrial pin assignment standards. This allows the invention to utilize the minimum number of pins on the connectors for control of the switching.

When the user selects the printer, the control circuit 200 commands the first switching circuit 210 to connect the printer connector 240 to the printer-port connector 230. During this time, the changes in the logic voltage states of the signals SLCTIN-, CL, ENP, ENPTR, EN, BI, and UNI are shown in FIG. 7A.

On the other hand, when the user selects the PC camera, the control circuit 200 commands the second switching circuit 220 to connect the PC camera connector 250 to the printer-port connector 230. In accordance with the various standards for the printer port connection, such as the SPP (Standard Printer Port), ECP (Extended Control Port), and EPP (Extended Printer Port) standards, the data communication can be either uni-directional or bi-directional. In the case of a uni-directional communication, the changes in the logic voltage states of the signals SLCTIN-, CL, BIDIR, UNIDIR, ENP, ENPTR, EN, BI, and UNI are shown in FIG. 7B; while in the case of a bi-directional communication, the changes in the logic voltage states of the same signals are shown in FIG. 7C.

The logic states of the signals ENP, ENPTR, BI, UNI, and EN that are issued by the PC respectively in the foregoing three cases are given in the following Table 1.

TABLE 1

|  | ENP | ENPTR | BI | UNI | EN |
|---|---|---|---|---|---|
| To Printer | 0 | 1 | 0 | 0 | 0 |
| To PC Camera (uni-directional) | 1 | 0 | 0 | 1 | 1 |
| To PC Camera (bi-directional) | 1 | 0 | 1 | 0 | 1 |

Figure 5:
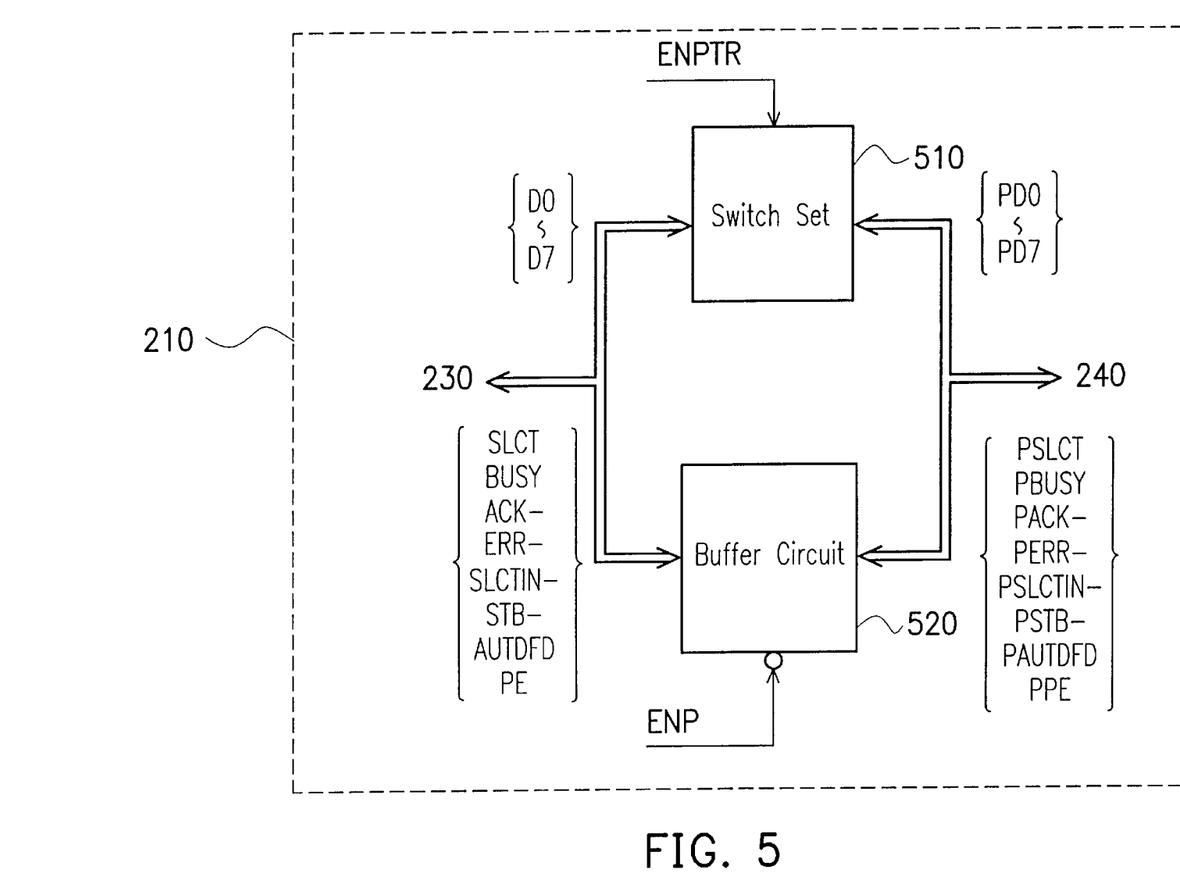
FIG. 5 is a schematic block diagram of a first switching circuit used in the DPS of FIG. 2.

As shown in FIG. 5, the first switching circuit 210 is composed of a switch set 510 under control by the ENPTR signal and a buffer circuit 520 under control by an inverted version of the ENP signal. The switch set 510 is a bi-directional type that can transfer data from the printer-port connector 230 to the printer connector 240, and vice versa; while buffer circuit 520 is a uni-directional type. The switch set 510 is used to connect the D0–D7 pins on the print-port connector 230 respectively to the PD0–PD7 pins on the printer connector 240; while the buffer circuit 520 is used to connect the SLCT, BUSY, ACK-, ERR-, SLCTIN-, STB, AUTOFD, and PE pins on the print-port connector 230 respectively to the PSLCT, PBUSY, PACK-, PERR-, PSLCTIN-, PSTB, PAUTOFD, and PPE pins on the printer connector 240.

Figure 6:
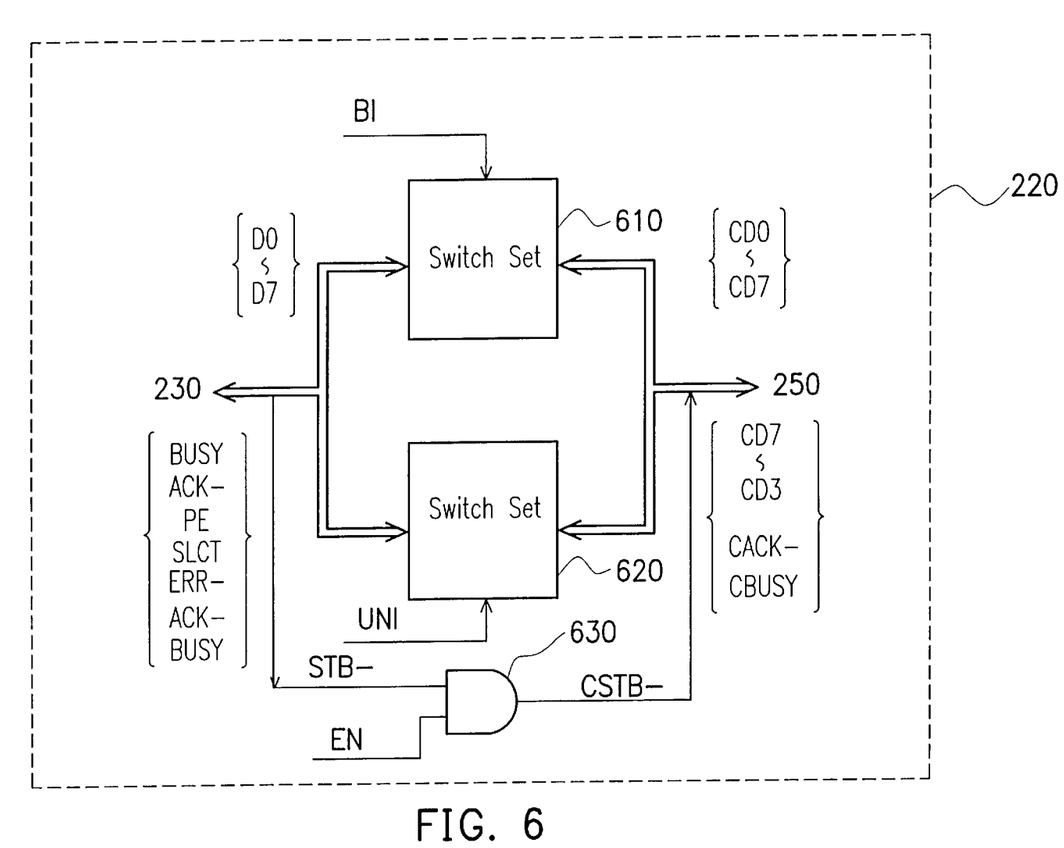
FIG. 6 is a schematic block diagram of a second switching circuit used in the DPS of FIG. 2.

Further, as shown in FIG. 6, the second switching circuit 220 includes a first switch set 610 under control by the BI signal and a second switch set 620 under control by the UNI signal. The first and second switch sets 610, 620 are both bi-directional type. The first switch set 610 is used to connect the D0–D7 pins on the print-port connector 230 to the CD0–CD7 pins on the PC-camera connector 250, while the second switch set 620 is used to connect the ERR-, SLCT, PE-, ACK-, and BUSY pins on the print-port connector 230 respectively to the CD3–CD7 pins on the PC-camera connector 250.

Further the second switching circuit 220 includes an AND gate 630 having a first input end receiving the STB- signal and a second input end receiving the EN signal. The logic output of the AND gate 630 is denoted as CSTB- and transferred to the PC camera connector 250.

When the user selects the printer, the control circuit 200 generates the control signals ENP=0, ENPTR=1, BI=0, UNI=0, EN=0, which cause the switch set 510 to connect the D0–D7 pins on the print-port connector 230 respectively to the PD0–PD7 pins on the printer connector 240, and also cause the buffer circuit 520 to connect the SLCT, BUSY, ACK-, ERR-, SLCTIN-, STB, AUTOFD, and PE pins on the print-port connector 230 respectively to the PSLCT, PBUSY, PACK-, PERR-, PSLCTIN-, PSTB, PAUTOFD, and PPE pins on the printer connector 240. During this operation, the second switch set 620 and the AND gate 630 are disabled because UNI=0 and EN=0.

On the other hand, when the use selects the PC camera which is operated in a uni-directional mode, the control circuit 200 generates the controls signals ENP=1, ENPTR=0, BI=0, UNI=1, EN=1, which cause the second switch set 620 to connect the ERR-, SLCT, PE, ACK-, and BUSY pins on the print-port connector 230 respectively to the CD3–CD7 pins on the PC-camera connector 250, the ACK- port to the CACK- port, the BUSY port to the CBUSY port; and also cause the output of the AND gate 630 (i.e., CSTB-) to take on STB-, effectively connecting the two signals. During this operation, the switch set 510 and buffer circuit 520 in the first switching circuit 210 and the first switch set 610 in the second switching circuit 220 and are disabled because ENP=1, ENPTR=0, BI=0.

When the use selects the PC camera which is operated in a bi-directional mode, the control circuit 200 generates the controls signals ENP=1, ENPTR=0, BI=1, UNI=0, EN=1, which cause the first switch set 610 to connect the D0–D7 pins on the print-port connector 230 respectively to the CD0–CD7 pins on the PC-camera connector 250; and also cause the output of the AND gate 630 (i.e., CSTB-) to take on STB-, effectively connecting the two signals. During this operation, the switch set 510 and buffer circuit 520 in the first switching circuit 210 and the second switch set 620 in the second switching circuit 220 are disabled because ENP=1, ENPTR=0, UNI=0.

Moreover, the switch set 510, first switch set 610, and second switch set 620 can be implemented by two ICs named 74HC4066; while the buffer circuit 520 can be implemented by an IC named 74LS244.

In conclusion, the DPS of the invention allows a PC to be selectively connected to a number of peripheral devices connected via the DPS to the PC by means of software control. These peripheral devices can be printers, PC cameras, scanners, external CD-ROM drives, and external hard disk drives. Moreover, these peripheral devices can be uni-directional types that transfer data only in one direction either from the PC or to the PC, or bi-directional data types that transfer data to and from the PC. All the selections and controls are achieved by the software so that the user is free from manually operating any switches.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A dynamic printer-port switcher for selectively connecting under software control at least two peripheral devices including a first peripheral device and a second peripheral device to a PC having a printer port, which comprises:

a printer-port connector for connecting said dynamic printer-port switcher via the printer port to the PC, said printer-port connector having a plurality of signal pins;

a first peripheral connector for connecting said dynamic printer-port switcher to said first peripheral device, said first peripheral connector having a plurality of signal pins;

a second peripheral connector for connecting said dynamic printer-port switcher to said second peripheral device, said second peripheral connector having a plurality of signal pins;

a first switching circuit connected between said printer-port connector and said first peripheral connector;

a second switching circuit connected between said printer-port connector and said second peripheral connector; and a control circuit, receiving software-issued control signals via said printer-port connector from the PC, for correspondingly generating a first control signal to command said first switching circuit to connect the signal pins on said first peripheral connector in a one-to-one manner to the signal pins on said printer-port connector and a second control signal to command said second switching circuit to connect the signal pins on said second peripheral connector in a one-to-one manner to the signal pins on said printer-port connector, wherein said control circuit includes:

a fast-charging/slow-discharging RC circuit having a small charging time constant and a large discharging time constant, said fast-charging/slow-discharging RC circuit having an input end connected to receive a request signal from said printer-port connector and an output end to output a voltage state of the request signal, a first D-type flip-flop having a clock input, a clear input, a D input, a normal output, and a complement output, the clock input connected to receive the request signal from said printer-port connector, the clear input connected to receive the output of said fast-charging/slow-discharging RC circuit, and the D input connected to receive the complement output of said first D-type flip-flop, a second D-type flip-flop having a clock input, a clear input, a D input, a normal output, and a complement output, the clock input connected to receive the complement output of said first D-type flip-flop, the clear input connected to receive the output of said fast-charging/slow-discharging RC circuit, and the D input connected to receive the complement output of the second D-type flip-flop, a first AND gate having a first input connected to receive the normal output of said second D-type flip-flop and a second input connected to receive the request signal from said printer-port connector, a second AND gate having a first input connected to receive the normal output of said first D-type flip-flop and a second input connected to receive the output of said first AND gate, and a third AND gate having a first input connected to receive the output of said first AND gate and a second input connected to receive the complement output of said first D-type flip-flop.

2. The dynamic printer-port switcher of claim 1, wherein said first peripheral device is a printer and said first peripheral connector is a standard printer connector; and wherein said second peripheral device is a PC camera and said second peripheral connector is a standard PC-camera connector.

3. The dynamic printer-port switcher of claim 1, wherein said first switching circuit includes:

a switch set of a bi-directional type, controlled by the complement output of said second D-type flip-flop, for connecting a first group of signal pins on said print-port connector to a corresponding group of signal pins on said first peripheral connector; and a buffer circuit of a uni-directional type, controlled by the normal output of said second D-type flip-flop, for connecting a second group of signal pins on print-port connector to a corresponding group of signal pins on said first peripheral connector.

4. The dynamic printer-port switcher of claim 3, wherein said switch includes a pair of 74HC4066 ICs.

5. The dynamic printer-port switcher of claim 3, wherein said buffer circuit includes a 74LS244 IC.

6. The dynamic printer-port switcher of claim 2, wherein said second switching circuit includes:

a first switch set of a bi-directional type, controlled by the output of said second AND gate in said control circuit, for connecting a first group of signal pins on said print-port connector to a corresponding group of signal pins on said PC-camera connector;

a second switch set of a bi-direction type, controlled by the output of said third AND gate in said control circuit, for connecting a second group of signal pins on said print-port connector to a corresponding group of signal pins on said PC-camera connector; and an AND gate, controlled by the output of said first AND gate in said control circuit, for connecting one signal pin on said print-port connector to a corresponding pin on said PC-camera connector.

7. The dynamic printer-port switcher of claim 4, wherein said first peripheral device is a printer and said first peripheral connector is a standard connector;

said switch set in said first switching circuit is used to connect the standard D0–D7 pins on said print-port connector respectively to standard PD0–PD7 pins on said printer connector; and said buffer circuit is used to connect the standard SLCT, BUSY, ACK-, ERR-, SLCTIN-, STB, AUTOFD, and PE pins on said print-port connector respectively to the standard PSLCT, PBUSY, PACK-, PERR-, PSLCTIN-, PSTB, PAUTOFD, and PPE pins on said printer connector.

8. The dynamic printer-port switcher of claim 7, wherein said first switch set includes a pair of 74HC4066 ICs.

9. The dynamic printer-port switcher of claim 7, wherein said second switch set includes a pair of 74HC4066 ICs.

10. The dynamic printer-port switcher of claim 7, wherein said AND gate in said second switching circuit is used to connect the standard STB- pin on said print-port connector to the standard CSTB- pin on said PC-camera connector.

11. The dynamic printer-port switcher of claim 8, wherein in the case of selecting said PC camera to the PC in a uni-directional mode, said second switch set in said second switching circuit is enabled to connect the standard ERR-, SLCT, PE-, ACK-, and BUSY pins on said print-port connector respectively to the standard CD3–CD7 pins on said PC-camera connector and the standard ACK- and BUSY pins on said print-port connector to the standard CACK- and CSTB- pins on said PC-camera connector; and concurrently said AND gate in said second switching circuit is enabled to connect the standard STB- pin on said print-port connector to the standard CSTB- pin on said PC-camera connector.

12. The dynamic printer-port switcher of claim 8, wherein in the case of selecting the PC camera to the PC in a bi-directional mode, said first switch set is enabled to connect the standard D0–D7 pins on said print-port connector to the standard CD0–CD7 pins on said PC-camera connector; and concurrently said AND gate in said second switching circuit is enabled to connect the standard STB- pin on said print-port connector to the standard CSTB- pin on said PC-camera connector.

13. The dynamic printer-port switcher of claim 1, wherein said dynamic printer-port switcher is connected to a plurality of peripheral devices including a scanner, an external CD-ROM drive, and an external hard disk drive.

14. The dynamic printer-port switcher of claim 1, wherein said fast-charging/slow-discharging RC circuit includes:

a diode having a positive end connected to the input end of said fast-charging/slow-discharging RC circuit and a negative end connected to the output end of said fast-charging/slow-discharging RC circuit;

a resistor connected across said diode; and a capacitor having a first end connected to the negative end of said diode and a second end connected to the ground, the voltage across said capacitor being taken as the output of said fast-charging/slow-discharging RC circuit.

* * * * *